(12) United States Patent
Steinmetz et al.

(10) Patent No.: US 6,286,809 B1
(45) Date of Patent: Sep. 11, 2001

(54) GAS FLOW OBSTRUCTING DEVICE

(76) Inventors: Douglas Scott Steinmetz, 32 Foxridge Dr., Linn Creek, MO (US) 65052; Steven L. Maness, 4402 Ludwick Blvd., Columbia, MO (US) 65203

( * ) Notice: Subject to any disclaimer, the term of this patent is extended or adjusted under 35 U.S.C. 154(b) by 0 days.

(21) Appl. No.: 09/235,346

(22) Filed: Jan. 21, 1999

(51) Int. Cl.[7] .................................................. F16L 37/28
(52) U.S. Cl. ..................................... 251/149.7; 251/149.1
(58) Field of Search .............................. 251/149.1, 149.6, 251/149.7

(56) References Cited

U.S. PATENT DOCUMENTS

| | | | |
|---|---|---|---|
| 1,138,093 | * | 4/1915 | Diners .............................. 251/149.7 X |
| 2,291,172 | * | 7/1942 | Scott .................................. 251/149.7 |
| 4,613,112 | | 9/1986 | Philpot et al. . |
| 5,577,706 | * | 11/1996 | King ................................... 251/149.6 |

FOREIGN PATENT DOCUMENTS

1159039 * 2/1958 (FR) .................................. 251/149.7

* cited by examiner

*Primary Examiner*—Kevin Lee
(74) *Attorney, Agent, or Firm*—Lathrop & Gage, L.C.

(57) ABSTRACT

A gas fitting for selectively obstructing gas flow from a gas source, particularly for medical use when gaseous material is to be dispensed through a hose. A hollow plunger is movably retained within a passage through the fitting and has a seal which, when no hose is attached to the fitting, prevents the flow of gas through the fitting. One end of the plunger extends beyond the gas outlet end of the fitting and is displaced axially inwardly when a gas hose is attached to the fitting. The axially inward displacement unseats the seal on the other end of the plunger and gas from the source passes through gas channels into the hollow area of the plunger and out the gas outlet end into the gas hose.

16 Claims, 2 Drawing Sheets

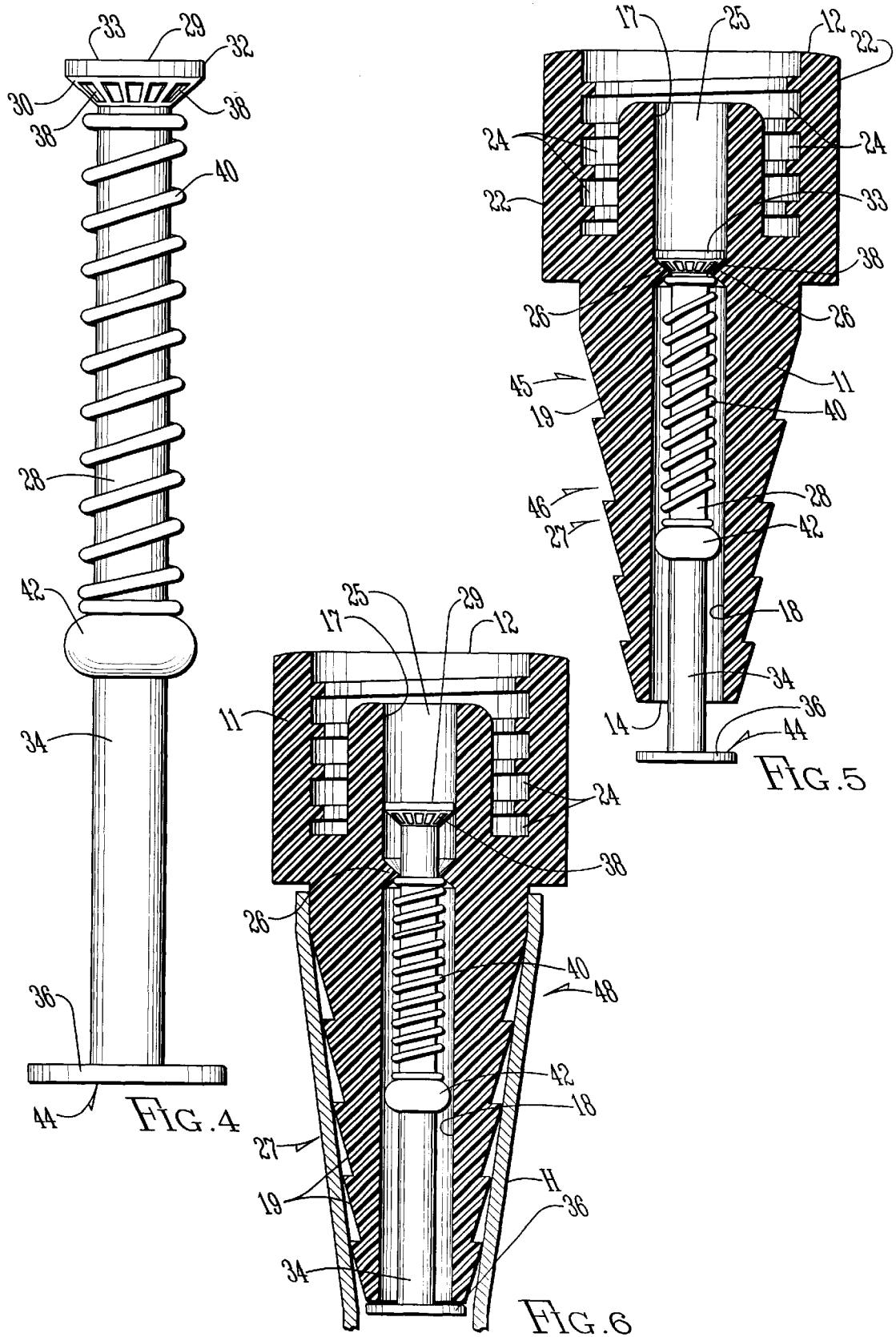

GAS FLOW OBSTRUCTING DEVICE

BACKGROUND OF THE INVENTION

1. Field of the Invention

The present invention relates to an innovative gas flow obstructing fitting for use on tanks or containers customarily used for storing and dispensing elements or compounds in a gaseous state. In particular, the present invention is directed to automatically obstruct the flow of a gas through a low pressure fitting, such as those used in dispensing oxygen to a patient when a dispensing tube is disconnected from the fitting.

2. Description of the Related Art

The use of gas fittings, commonly called nipple adapters, is well known within industries utilizing pressurized containers of gas. Such fittings or adapters generally are easily attached to the container of gas and often are conically shaped having protrusions for securing flexible hoses thereabout. Particularly, fittings used in the medical field are usually suited for quick connection of a flexible hose onto the fitting by simply urging the hose onto the conical fitting until the hose is frictionally secured about the fitting.

There are two types of fittings commonly found in use in medical situations. Most common are disposable cone-shaped fittings formed of hardened plastic which provide internal threads at the widest end of the cone for securing the fitting to a male-threaded fitting or a gas regulator generally provided on compressed gas tanks. The fitting generally has an axial bore provided through the length thereof, with the fitting having a desired diameter to assist in the regulation of gas pressure provided to the patient. The bore may have a uniform diameter throughout the length of the fitting or may be tapered, depending on the intended application.

The second fitting often found in medical settings is a two piece quick release fitting. An example of such a fitting may be found in U.S. Pat. No. 4,613,112 to Phlipot and Scharfenberg. Typically, quick release fittings are expensive to manufacture and have the propensity to leak over time. Further, such fittings are not typically used with low pressure gases, which is one of the intended uses for the instant invention.

Several problems commonly occur when using gases, particularly oxygen, in medical settings. Usually, many medical personnel have access to and use a limited number of oxygen tanks. When using oxygen, the gas is generally turned on only when a hose is attached to the fitting. It is very common, however, for a hose to be removed from the tank fitting after use without turning off the tank valve itself. As a result, the pressurized gas bleeds out into the atmosphere. When the next person needs to use the gas, the tank may be empty or low in pressure, which obviously can endanger the life of the patient for which the gas was intended. In addition, escaping gas can be dangerous as the escaping oxygen supports combustion. Further, medical gases are typically expensive; therefore, it would be wasteful to allow gas to escape in the manner described.

It is an object and purpose of the present invention to provide a gas fitting which automatically stops the flow of gas when a dispensing hose is removed therefrom to.

Another object and purpose of the present invention to is to provide a gas fitting which is easily attached to a gas source and which functionally receives the type of gas hoses commonly used for medical purposes.

Yet another object and purpose of the present invention of is to provide a gas fitting which has few moving parts and easily functions to prevent unwanted gas leakage upon disconnection of a dispensing gas hose from the gas fitting.

Still another object and purpose of the present invention of is to provide an inexpensive gas fitting which is easy to manufacture.

Other objects and advantages of the present invention will become apparent from the following description taken in conjunction with the accompanying drawings, which constitute a part of this specification and wherein are set forth exemplary embodiments of the present invention to illustrate various objects and features thereof.

SUMMARY OF THE INVENTION

The gas flow obstructor of the present invention has a conical shaped housing generally configured with an air inlet end to be removably engaged to a source of compressed gas. At an opposite end, an air outlet end is provided for the expulsion of gaseous material.

The outer periphery of the device is provided with a series of diminishing annular retention members which allow the frictional engagement of a flexible hose commonly used to transfer gases. Grasping elements may be provided to assist the user in attaching the device to a gas supply.

A generally cylindrical channel passes through the housing and is provided with a sealing ledge about the circumference of the channel near the air inlet end. Movably retained within the cylindrical channel is a hollow cylindrical plunger having a capped distal end, an open proximal end and a spring stop. A spring, or other resilient mechanism about the plunger is operatively retained between the distal end and the spring stop such that the cylindrical plunger can be moved axially within the channel for a predetermined distance. The capped distal end is maintained between the sealing ledge and the air inlet end and has a plurality of openings about its periphery which allow gaseous communication between the air inlet end and the proximal end of the cylindrical plunger. An annular push plate is provided at the proximal end of the plunger adjacent the opening at the proximal end and extends laterally beyond the channel through the housing and is dimensioned slightly smaller than the inner circumference of a gas hose generally used on the device.

In the resting or closed position, the tension on the spring or resilient member urges the capped distal end of the plunger against the sealing ledge within the channel operatively closing and sealing the plurality of openings at the capped distal end. In this position the annular push plate extends beyond the conical housing.

As an air hose is forced onto the conical housing, the annular push plate is moved axially toward the conical housing and the spring member encircling the plunger is compressed between the spring stop and the sealing ledge. The plunger continues to move axially toward the air inlet end until the annular push plate is seated against the conical housing. In this open position, the plurality of openings at the capped distal end are in gaseous communication with the air inlet end and gas from a source moves through the plurality of openings into the hollow of the plunger and out the opening in the proximal end of the plunger.

BRIEF DESCRIPTION OF THE DRAWINGS

FIG. 4 is a side elevational view of an embodiment of a plunger of the gas flow obstructing mechanism of the present invention.

FIG. 5 is an axial sectional view of an embodiment of the present invention showing a configuration of the plunger of the gas flow obstructing mechanism wherein gas flow therethrough is obstructed.

FIG. 6 is an axial sectional view of an embodiment of the present invention showing a configuration of the gas flow obstructing plunger wherein gas flow therethrough is not obstructed, in accordance with the present invention.

DETAILED DESCRIPTION OF THE PREFERRED EMBODIMENTS.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
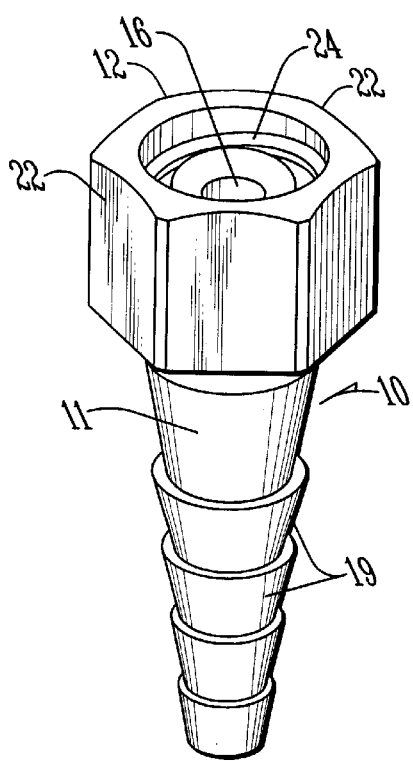
FIG. 1 is a perspective view of a gas flow obstructing device constructed in accordance with the present invention.
Figure 2:
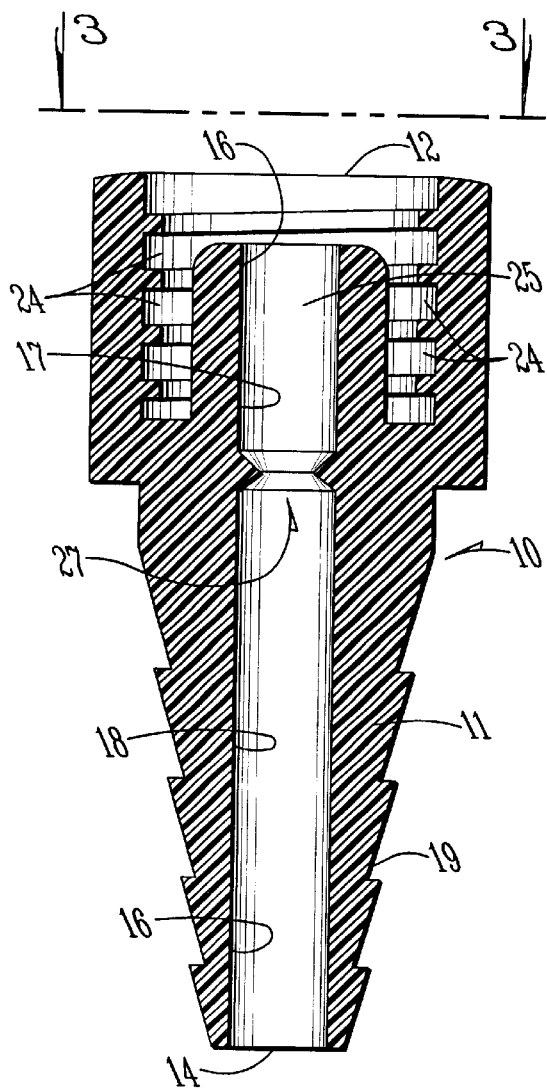
FIG. 2 is an axial sectional view through an embodiment of the present invention without a gas flow obstructing mechanism in place.
Figure 3:
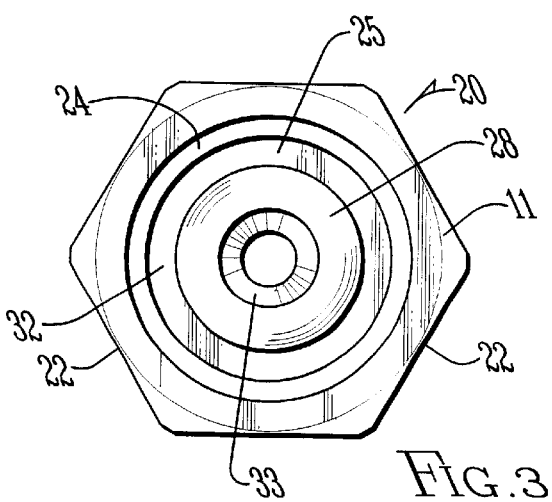
FIG. 3 is a view of a gas inlet end of an embodiment of the present invention, taken along line 3—3 of FIG. 2.

The reference numeral 10 generally refers to a conical gas fitting device or gas flow obstructor including a gas flow obstructing mechanism in accordance with the present invention, as schematically shown in FIGS. 1 through 6. Referring to the drawings in detail, FIG. 1 illustrates a perspective view of the conical gas fitting device 10 having a housing 11 with a gas inlet or input end 12 and a gas outlet end 14 which define the terminus of a channel 16 passing through the gas fitting device 10 wherein the channel 16 has a proximal portion 17 and a distal portion 18. The gas fitting device 10 is provided with a series of diminishing annular retention members 19 that are commonly used to frictionally engage the inner periphery of and to retain a hose, as shown in FIG. 6. Adjacent to the gas inlet end 12 is grasping means 20 as shown in FIG. 3 wherein the grasping means 20 is configured to assist a user in tightening and loosening the gas fitting device 10 to and from a gas source (not shown). For example, the device 10 may be provided with grasping means 20 wherein a plurality of opposing planar surfaces 22 are configured to be gripped with a common wrench or tool for tightening and loosening the gas fitting device 10 from a gas source.

Referring now to FIG. 2, the channel 16 is generally cylindrical and may be provided with a predetermined diameter to accommodate gas flow for a specific application. An internal threaded portion 24, adjacent the gas inlet end 12, allows the gas fitting device 10 to be attached to common gas containers (not shown), such as those found in the medical field. A sealing ledge 26 having an opening 57 therethrough is located proximate to the air inlet end 12. A generally open area 25 is provided proximate the internal threaded portion 24 for connection to a gas supply (not shown).

As shown in FIG. 5, the gas flow obstructing mechanism 27, such as a cylindrical plunger 28, shown in enlarged detail in FIG. 4, is spaced axially and slidably mounted within the channel 16. A proximal end 29 of the cylindrical plunger 28 is provided with a flange or sealing end 30 with a sealing mechanism 32 about its periphery substantially adjacent the gas inlet end 12. The cylindrical plunger 28 has a flow or distal end 34 provided with a push plate 36, as shown in FIG. 4. The push plate 36 is dimensioned slightly larger than the inside diameter of a gas hose H attached to the gas outlet end 14. Preferably, the push plate 36 is oriented radially outwardly from the distal end 34 and is ovally or circularly shaped.

The sealing end 30, having a circumference slightly larger than the channel 16 and of sufficient dimensions to sealingly seat against the sealing ledge 26 to cooperatively form a gas-tight seal therebetween, is provided with a solid end cap 33. Further, the cylindrical plunger 28 is provided with one or more, preferably a plurality of, gas passages 38 spaced substantially adjacent the end cap 33 configured to operatively allow gaseous communication into a partial bore 44 running axially lengthwise from the gas passages 38 to and through the distal end 34 and the push plate 36. A shut-off mechanism 45 is configured to automatically obstruct or prevent gas flow through the device 10 as hereinafter described. For example, the shut-off mechanism 45 may include a resilient mechanism or spring member, such as spring or preferably, a coil or compression spring 40 encircling the cylindrical plunger 28 and operatively retained in the channel 16 between the sealing ledge 26 and a spring stop 42 on the cylindrical plunger 28.

The device 10 is shown in a closed or resting configuration or position, as designated by the numeral 46 in FIG. 5. The spring 40 urges the cylindrical plunger 28 axially along the channel 16 generally toward the gas outlet end 14. As a result, the sealing end 32 is forced by the tension of the spring 40 against the sealing ledge 26 effectively closing access of gas contained in the proximal portion 17 to the plurality of gas passages 38. In other words, gas from a supply is trapped in the generally open area 25 by the solid end cap 33 and the sealing ledge 26. Stated another way, gas flow is prevented from flowing from the gas source through the partial bore 44 as the gas flow obstructing mechanism 27 assumes the closed configuration 46. In the closed or resting position 46, the push plate 36 extends beyond the gas outlet end 14 of the conical gas fitting device 10.

The device 10 is configured to assume an open or operational position, as designated by the numeral 48 in FIG. 6, wherein the plunger 28 is displacable axially along the channel 16 generally toward the gas inlet end 12 such that gas flow access and communication is established between the proximal portion 17 and the plurality of gas passages 38. Conversion of the device 10 from the closed configuration 46 to the open configuration 48 occurs as a gas hose from a gas source is attached to the annular retention members 19 of the conical gas fitting device 10. By attaching the gas hose H, the push plate 36 is urged to a seated position at the gas outlet end 14, as shown in FIG. 6. As a result, the spring 40 is further compressed, thereby displacing the sealing end 32 axially toward the gas inlet end 12. The plurality of gas passages 38 is then in gaseous communication with the general open area 25 allowing gas received into the gas inlet end 12 to pass through the plurality of gas passages 38 into the bore 44 through the cylindrical plunger 28 and out through the flow end 34. In other words, gas flow is allowed to flow from the gas source through the partial bore 44 as the gas flow obstructing mechanism 27 assumes the open configuration 48.

When the gas hose H is removed from the gas fitting device 10, the push plate 36 is no longer constrained by the gas hose H and the spring 40 automatically returns the device 10 to the closed configuration 46 to prevent gas from escaping through the device 10 into the ambient atmosphere even though the shut-off valve of the gas source may not have been closed.

Whereas the present invention has been described in relation to the drawings attached hereto, it should be understood that other and further configurations, apart from those shown or suggested herein, may be made within the spirit and scope of this invention.

What is claimed is:

1. A device for selective connection to a gas source, comprising:
   a) a conical housing provided with a channel therethrough, configured to receive and frictionally retain a gas hose;
   b) a plunger having a bore therethrough movably secured within said channel, said plunger having a sealing end and a flow end;
   c) a plurality of gas passages within the plunger proximate said sealing end which provides gaseous communication between the bore and the channel;
   d) a spring encircling said plunger; and
   e) a push plate formed onto said flow end and extending axially beyond said conical housing.

2. A device for selectively obstructing low pressure gas flow, comprising:
   a) a conical fitting having a gas inlet and a gas outlet defining a cylindrical channel therethrough, further having a sealing ledge with an opening therethrough fixed within said cylindrical channel;
   b) a cylindrical plunger, having a partial bore therethrough and movably secured within said channel, said plunger having a flow end with a push plate, a spring stop spaced substantially adjacent to said flow end, and a seal end, wherein said seal end is spaced between said gas inlet and said sealing ledge, and said flow end is spaced substantially adjacent to said gas outlet and said push plate extends axially beyond said gas outlet;
   c) a sealing means attached to said seal end for selectively sealing said channel;
   d) at least one gas passage formed within said plunger proximate said seal end wherein said at least one gas passage is configured to operatively provide gaseous communication between said gas inlet end and said partial bore through said plunger; and
   e) a spring member encircling said plunger and operably positioned between said sealing ledge and said spring stop,
   wherein placement of a gas hose onto said gas outlet displaces said push plate axially toward said gas outlet such that said seal end is disengaged from said sealing ledge, operatively displacing said at least one gas passage such that gas from the gas source is flowable therethrough, and wherein, upon removal of said gas hose, said spring member forcibly urges said plunger axially toward said gas outlet such that said sealing means engages said sealing ledge to thereby operatively prevent flow of gas therethrough.

3. The device of claim 2 wherein the plurality of gas passages and the bore of said cylindrical plunger are configured to deliver precise volumes of a predetermined gas at a predetermined pressure.

4. A device for connecting between a gas source and a hose for distribution of gas from the gas source, the device comprising:
   a) a housing having an input end, configured to connect to a gas source, and an output end, configured to connect to a hose; said housing having a channel therethrough connecting said input end to said output end to thereby allow gas flow communication between the gas source and the hose; and
   b) a gas flow obstructing mechanism mounted within said channel; said gas flow obstructing mechanism having a closed configuration, wherein gas flow is prevented from flowing through said channel as said output end is disconnected from the hose, and an open configuration, wherein gas flow is allowed to flow through said channel as said output end is connected to the hose.

5. The device of claim 4, wherein said gas flow obstructing mechanism includes:
   a) said channel having a ledge formed therein near said input end, and
   b) said gas flow obstructing mechanism includes a plunger slidably mounted within said channel, said plunger having a flange formed about a proximal end thereof,
   wherein said ledge and said flange are configured to cooperatively form a gas-tight seal therebetween as said gas flow obstructing mechanism assumes said closed configuration.

6. The device of claim 5, wherein said gas flow obstructing mechanism further includes a resilient mechanism configured to urge said flange against said ledge to thereby cooperatively form said gas-tight seal therebetween as said gas flow obstructing mechanism assumes said closed configuration.

7. The device of claim 6, wherein said gas flow obstructing mechanism further comprises:
   a) said resilient mechanism having a spring stop, and
   b) said resilient mechanism including a spring mounted between said ledge and said spring stop.

8. The device of claim 7, wherein said spring is a compression spring encircling said plunger.

9. The device of claim 5, wherein said plunger comprises:
   a) a distal end;
   b) a partial bore extending from just beneath said proximal end thereof to and through said distal end; and
   c) at least one passage connected in gas flow communication with said partial bore;
   wherein said at least one passage is configured such that gas flow is prevented from flowing from the gas source through said partial bore as said gas flow obstructing mechanism assumes said closed configuration, and such that gas flow is allowed to flow from the gas source through said partial bore as said gas flow obstructing mechanism assumes said open configuration.

10. The device of claim 5, wherein said plunger extends beyond said output end of said housing.

11. The device of claim 5, wherein said plunger includes a push plate formed at a distal end thereof.

12. The device of claim 11, wherein said push plate is oriented radially outwardly from said distal end.

13. The device of claim 12, wherein said push plate has a dimension greater than the inside diameter of the hose.

14. The device of claim 13, wherein said push plate is ovally shaped.

15. The device of claim 13, wherein said push plate is circularly shaped.

16. A device for connecting between a gas source and a hose for distribution of gas from the gas source, the device comprising:
   a) a housing having an input end, configured to connect to a gas source, and an output end, configured to connect to a hose; said housing having a channel connecting said input end to said output end to thereby allow gas flow therethrough; and b) a gas flow obstructing mechanism mounted within said channel; said gas flow obstructing mechanism having:
   1) a closed configuration wherein gas from the gas source is prevented from flowing through said housing as said output end is disconnected from the hose,
   2) an open configuration wherein gas from the gas source is allowed to flow through said housing as said output end is connected to the hose,
   3) a ledge formed within said channel near said input end, and
   4) a plunger slidably mounted within said channel and extending beyond said output end of said housing, said plunger having a flange formed about a proximal end thereof, a circularly shaped push plate formed at a distal end thereof and oriented radially outwardly therefrom wherein said push plate has a dimension greater than the inside diameter of the hose, a partial bore extending from just beneath said proximal end of said plunger to and through said push plate, and a plurality of passages connected in gas flow communication with said partial bore such that gas from the gas source is allowed to flow through said partial bore as said output end is connected to the hose, and
   5) a resilient mechanism having a spring stop and a compression spring mounted between said ledge and said spring stop and encircling said plunger such that said flange is operatively urged against said ledge to thereby cooperatively form a gas-tight seal between said flange and said ledge as said gas flow obstructing mechanism assumes said closed configuration such that gas flow is prevented from flowing from the gas source through said channel and said partial bore as said gas flow obstructing mechanism assumes said closed configuration and such that gas flow is allowed to flow from the gas source through said channel and said partial bore as said gas flow obstructing mechanism assumes said open configuration.

* * * * *